(12) United States Patent
Hoi

(10) Patent No.: US 7,104,355 B2
(45) Date of Patent: Sep. 12, 2006

(54) SNOWMOBILE, AND THE ARRANGEMENT OF THE ENGINE AND ACCESSORY COMPONENTS THEREOF

(75) Inventor: Yosuke Hoi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/064,703

(22) Filed: Feb. 24, 2005

(65) Prior Publication Data
US 2005/0199431 A1    Sep. 15, 2005

(30) Foreign Application Priority Data
Mar. 11, 2004    (JP)    .............................. 2004-069608

(51) Int. Cl.
*F02B 61/02*    (2006.01)
(52) U.S. Cl. ...................................... 180/291; 180/190
(58) Field of Classification Search ................ 180/182, 180/186, 190, 291, 297
See application file for complete search history.

(56) References Cited

U.S. PATENT DOCUMENTS 6,929,081 B1 *    8/2005    Pichler et al. .............. 180/190

2002/0134603 A1 *    9/2002    Ashida et al. .............. 180/186

FOREIGN PATENT DOCUMENTS

| JP | 2002266653 A |   | 9/2002 |
|----|--------------|---|--------|
| JP | 2003083023 A | * | 3/2003 |
| JP | 2004293393 A | * | 10/2004 |

* cited by examiner

*Primary Examiner*—Kevin Hurley
(74) *Attorney, Agent, or Firm*—Carrier, Blackman & Associates, P.C.; William D. Blackman; Joseph P. Carrier

(57) ABSTRACT

A snowmobile, having an arrangement of components in which the layout of various accessory devices is improved for an internal combustion engine mounted thereon. A dry sump oil tank, a water pump and a starter motor are disposed in a concentrated space at a forward-facing portion of an internal combustion engine, which is mounted on a snowmobile at a position close to the front side of a body of the snowmobile. A steering shaft is arranged close to the front portion of the internal combustion engine, and is accommodated by modifying the shape of closely adjacent parts. Accordingly, the limited available space in a snowmobile is effectively used, and a rider riding in back of the engine can easily and closely approach the engine. The limited space inside the snowmobile cover is used effectively, by efficiently arranging selected accessory devices for an internal combustion engine mounted on the snowmobile.

19 Claims, 13 Drawing Sheets

PRIOR ART

SNOWMOBILE, AND THE ARRANGEMENT OF THE ENGINE AND ACCESSORY COMPONENTS THEREOF

CROSS-REFERENCE TO RELATED APPLICATIONS

The present invention claims priority under 35 USC 119 based on Japanese patent application No. 2004-069608, filed on Mar. 11, 2004. The subject matter of the referenced priority document is incorporated by reference herein.

BACKGROUND OF THE INVENTION

1. Field of the Invention

The present invention relates to a snowmobile, and more particularly to an arrangement of components within a snowmobile, in which the layout of selected accessory devices for an internal combustion engine mounted on the snowmobile is improved.

2. Description of the Background Art

There are some examples of known snowmobiles in which the snowmobile has an internal combustion engine with compactly arranged accessory devices, to accommodate limited available interior space in the snowmobile body. These arrangement considerations are especially relevant in a small-sized snowmobile. An example of a small snowmobile having such a structure is disclosed in Japanese Laid-Open Patent No. 2002-266653 (pp. 4–5, FIG. 2), in which an internal combustion engine is installed within a limited space in the vehicle body to ensure an advantage in the mounting space. The snowmobile disclosed in Japanese Laid-Open Patent No. 2002-266653 has a shaft layout structure such that a crankshaft, as well as a traveling power output shaft and a pump drive shaft (auxiliary device shaft), are arranged parallel with one another in the vehicular transverse direction. As such, the shafts form a triangular shape when viewed from the side of the vehicle body. To achieve this configuration, the pump drive shaft is disposed below the power output shaft, and the crankshaft is disposed at an intermediate position between the power output shaft and the pump drive shaft, and on a rear side of the engine. According to this shaft layout structure, accessory devices to be arranged around the internal combustion engine are arranged compactly on both front and rear sides of the engine.

According to a snowmobile 060 of the invention disclosed in Japanese Laid-Open Patent No. 2002-266653, which is illustrated in FIGS. 13 and 14 of the present drawings for comparative purposes, there is used a power output shaft 02. The power output shaft 02 is connected through the engagement of gears to a crankshaft 01 of an internal combustion engine 0E mounted on the snowmobile 060, and rotation of the power output shaft 02 is transmitted to an endless track belt 065 through a V belt type automatic transmission 066, whereby the snowmobile is driven for travel.

In the internal combustion engine OE mounted on the snowmobile 060 of this prior art reference, the crankshaft 01, the power output shaft 02 for driving the snowmobile 060, and a pump drive shaft 03 as an auxiliary device shaft, are arranged so as to be parallel with one another in the transverse direction of the snowmobile 060 and so as to mutually form a triangle when viewed from the side of the vehicle body.

More particularly, a pump drive shaft 03, for activating a cooling pump and an oil pump, is disposed below the power output shaft 02. The crankshaft 01 is disposed at an intermediate position between and behind the power output shaft 02 and the pump drive shaft 03. As a result, various accessory devices to be arranged around the engine OE are disposed compactly, especially on both front and rear sides of the engine OE.

The compact layout structure of various accessory devices around the engine OE in the invention disclosed in Japanese Laid-Open Patent No. 2002-266653 leads to a reduction in size of the internal combustion engine OE. Such a small-sized internal combustion engine OE in the small-sized snowmobile 060 not only facilitates the installation thereof, but also provides an advantageous structure in point of space.

Thus, Japanese Laid-Open Patent No. 2002-266653 provides an improved structure for effective use of such an extremely limited body space as in the small-sized snowmobile, as compared to older art which preceded publication of this reference. However, the provision of a further improved structure for effective use of body space in the snowmobile, and for facilitating installation of an internal combustion engine onto the snowmobile body is needed. Particularly, an improved structure is needed for a small-sized snowmobile for effective use of mounting space for an internal combustion engine, and various accessory devices associated with the engine, which occupy a large relative importance related to the available space.

SUMMARY OF THE INVENTION

The present invention is concerned with an improved structure of a snowmobile which will solve the above-mentioned problems and effectively use the limited available space in the snowmobile. The present invention takes into consideration the layout arrangement of accessory devices with respect to an internal combustion engine mounted on the snowmobile. According to the present invention a snowmobile is provided which includes an internal combustion engine mounted on a front side of a body of the snowmobile. The snowmobile also includes a seat provided behind the internal combustion engine and a crankshaft of the internal combustion engine. The rotation of the crankshaft is transmitted to an endless track belt through a transmission mechanism, whereby the endless track belt is driven to propel the snowmobile. The improvement in the arrangement of the engine and the auxiliary components is characterized in that accessory devices are disposed in a concentrated manner in a front portion of the internal combustion engine.

The present invention is also characterized in that the accessory devices disposed in a concentrated manner in a front portion of the internal combustion engine are a water pump, a dry sump oil tank, and a starter motor.

The present invention is further characterized in that the water pump and the starter motor, both disposed in the front portion of the internal combustion engine, are received respectively within cutout spaces defined within the dry sump oil tank.

According to a first aspect of the invention, a snowmobile includes an internal combustion engine mounted on a front side of a body of the snowmobile, a seat provided behind the internal combustion engine, and a crankshaft of the internal combustion engine. In the snowmobile, the rotation of the crankshaft is transmitted to an endless track belt through a transmission mechanism. Accessory devices are disposed in a concentrated manner in a front portion of the internal combustion engine. Thus, since accessory devices are closely clustered together at the front portion of the engine, and are not disposed in the rear portion of the engine, i.e., on the seat side of the internal combustion engine, it becomes possible for the rider to closely approach and easily access the engine. Further, a limited mounting space in the body of the snowmobile is effectively used.

Moreover, since accessory devices are concentrated in the front portion of the internal combustion engine, the engine itself is small-sized and made compact. It becomes easy to ensure an effective space around the engine, so that the mounting of the internal combustion engine onto the vehicle body becomes easier and the engine mounting work efficiency is improved, whereby it is possible to reduce the cost.

According to a second aspect of the invention, in combination with the first aspect, the accessory devices concentrated in the front portion of the internal combustion engine include a water pump, a dry sump oil tank, and a starter motor. Consequently, it is possible to provide an orderly arrangement of the auxiliary components of the engine, and an effective space around the engine is easily ensured. Moreover, since the engine can be constructed in a small and compact form, the mounting of the engine to the vehicle body is more easily accomplished, and the engine mounting work efficiency is improved, whereby the cost can be reduced.

Further, according to a third aspect of the invention, in combination with the second aspect of the invention, the water pump and the starter motor, both disposed in the front portion of the internal combustion engine, are received respectively within cutout spaces formed by the dry sump oil tank. Consequently, so-called "dead space" around the engine diminishes to attain effective use of space, and the surroundings of the engine are compactly ordered, whereby it becomes easier to ensure an effective space. In addition, since the engine can be made compact, mounting of the engine onto the vehicle body can be done easily with a space margin and the engine mounting work efficiency is improved, whereby it is possible to attain the reduction of cost.

Selected examples of modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE INVENTION

In an internal combustion engine mounted on a snowmobile, a number of accessory devices such as a dry sump oil tank, a water pump and a starter motor are disposed in a concentrated area at a front portion of the engine which faces the front side of the vehicle. An embodiment of the present invention will be described herein, with reference to FIGS. 1 to 12.

Figure 1:
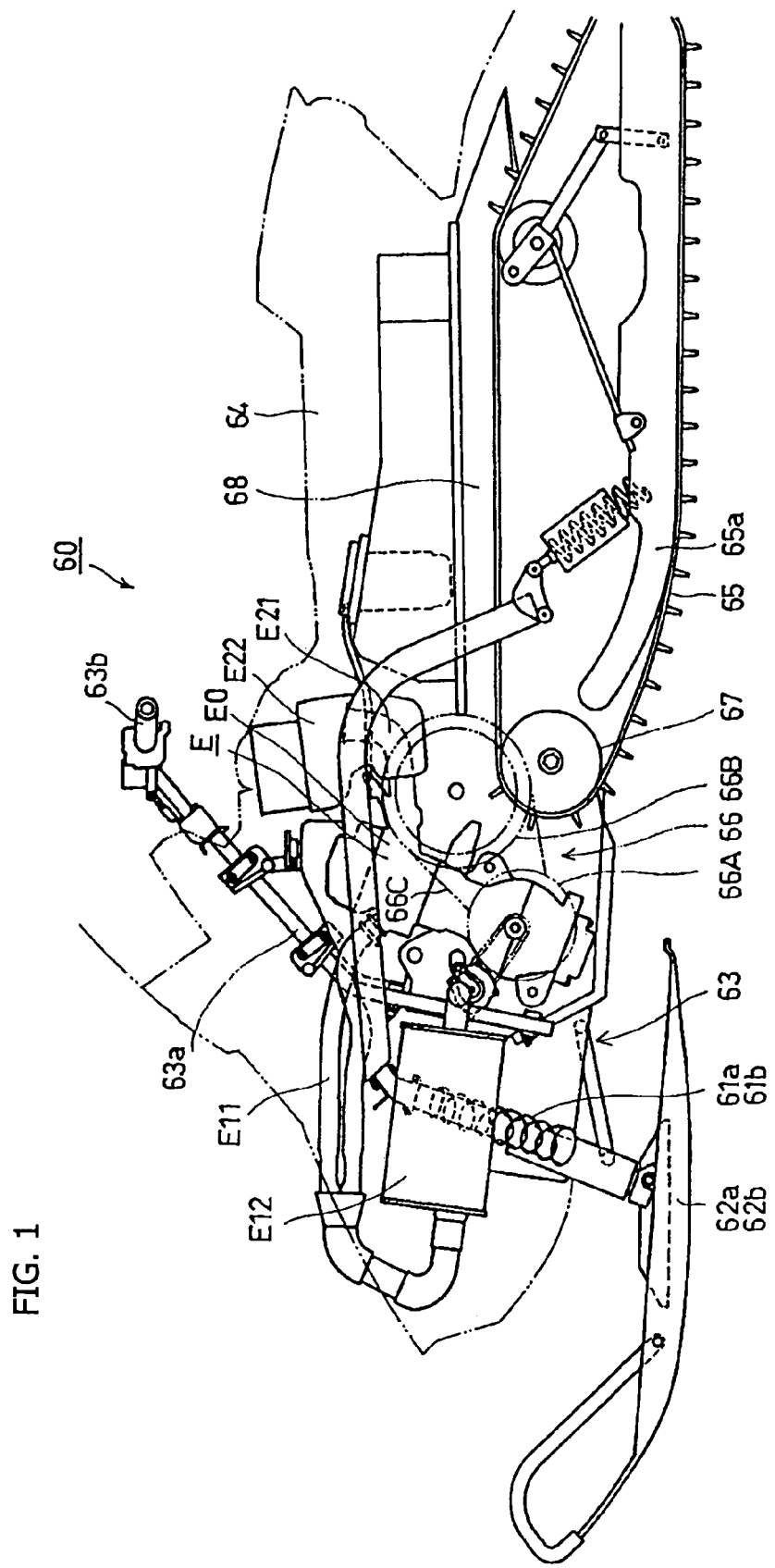
FIG. 1 is a side plan view of a snowmobile according to an illustrative embodiment of the present invention, with an exterior cover, etc. removed for showing a main structural portion and internal combustion engine thereof.
Figure 2:
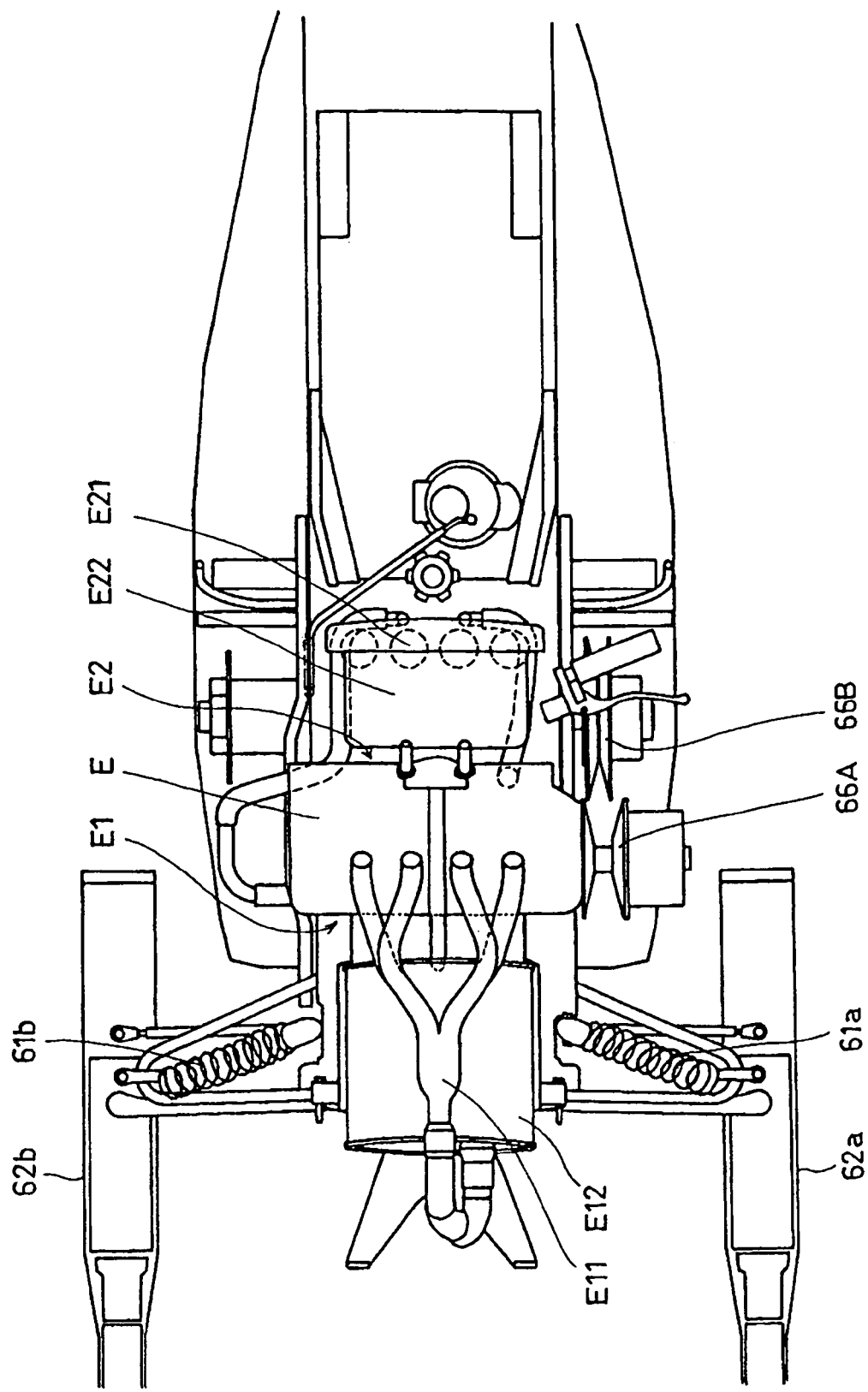
FIG. 2 is a top plan view of a mid portion of the snowmobile of FIG. 1 according to the present invention, with an exterior cover, etc. removed for showing a main structural portion thereof and showing the relative locations of the intake pipes and exhaust pipes of the engine.

FIG. 1 is a side plan view of a snowmobile 60 incorporating an engine and accessory component arrangement according to an embodiment of the invention, and FIG. 2 is a top plan view of the snowmobile 60 of FIG. 1. As can be seen from FIGS. 1–2, an internal combustion engine E is mounted on a body of the snowmobile 60 at a position close to the front of the body. Left and right front suspensions 61a, 61b are disposed in the front portion of the vehicle body and a steering ski 62a and 62b is connected to each of the front suspensions 61a and 61b, respectively.

The steering skis 62a and 62b are connected to a handlebar 63b, located in the approximate center of the vehicle body, through a steering shaft 63a and members of a steering system 63 such as pivot arms and link rods. The members of the steering system 63 are disposed so as to pass through the front portion of the internal combustion engine E. A seat 64 is disposed on the vehicle body at a position behind the handlebar 63b.

Further provided is a V belt type automatic transmission 66 having a driving pulley 66A and a driven pulley 66B. The driving pulley 66A and the driven pulley 66B constitute a drive section for transmitting a drive force of the internal combustion engine, mounted at a position close to the front side of the vehicle body, to an endless track belt 65. In accordance with a transmission method to be described later, a rotational drive force, shifted by the automatic transmission 66, is transmitted to a driving wheel 67. The driving wheel 67 transmits the drive force to the endless track belt 65, whereby the endless track belt 65 is driven to propel the snowmobile 60. A radiator 68 is disposed under the seat 64.

Figure 3:
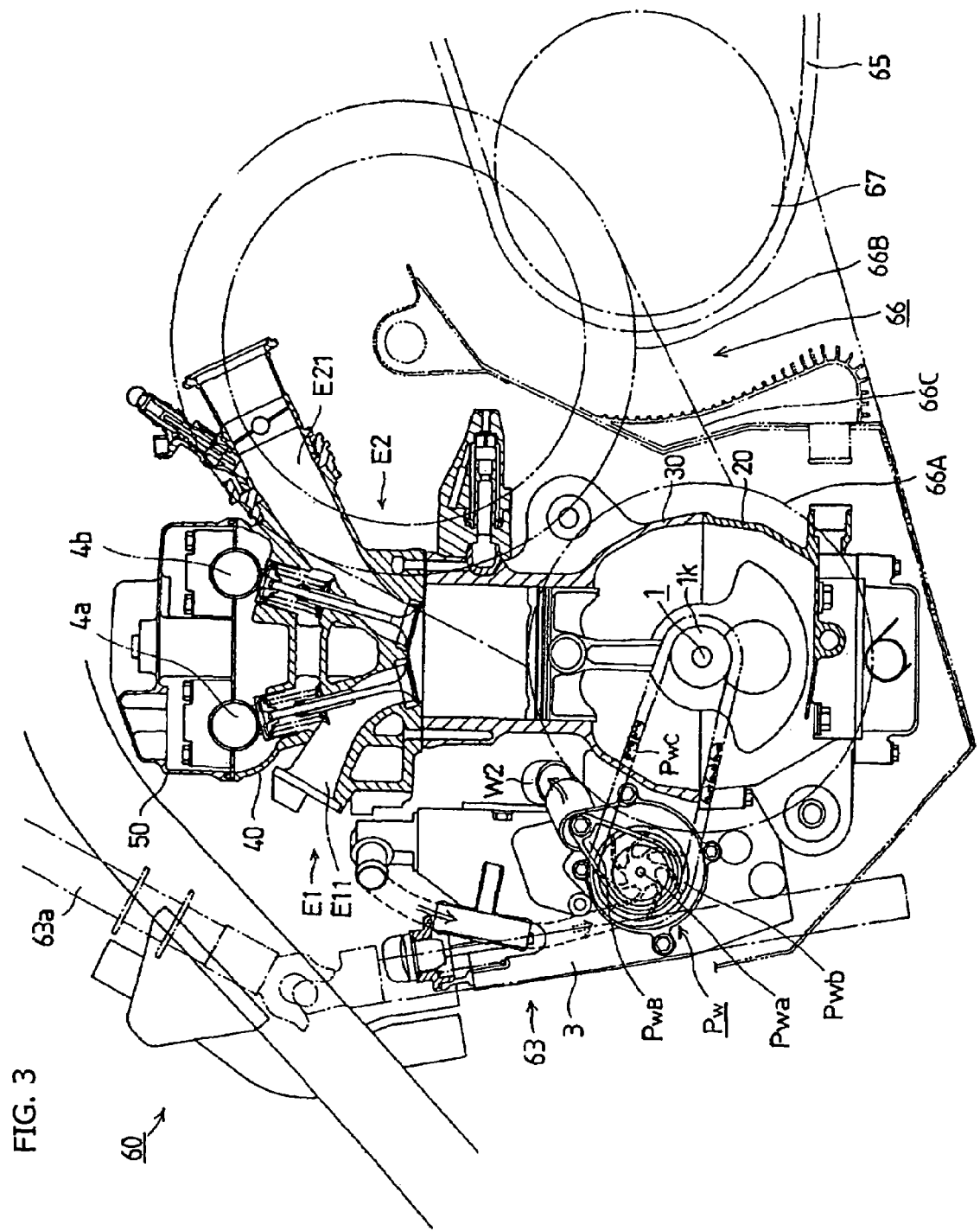
FIG. 3 is an enlarged side detail view of the internal combustion engine of the snowmobile of FIG. 1, showing the engine mounting portion.

Intake pipes E21 and exhaust pipes E11 of the engine E are shown FIGS. 1, 2, and 3. The intake pipes E21 extend toward the back of the vehicle body from the rear portion of the engine E and are then bent upward, with an air cleaner E22 being disposed on the upwardly bent portion. As can be seen from FIG. 2, four exhaust pipes E11 are combined into two sets, each consisting of two pipes, from the front portion of the engine E toward the front side of the vehicle body. The two sets of pipes are then gathered into one pipe, then the pipe is bent in U shape on the front side of the vehicle body, and again extends backward of the vehicle body to form a backward bent portion. A muffler E12 is disposed on the backward bent portion.

In FIG. 3, an enlarged view of a portion of the snowmobile body is shown, in an area thereof where the internal combustion engine E is mounted. Part of the vehicle body frame is also shown. The V belt type automatic transmission 66 is included as a part of the drive section, and a part of the steering system 63 such as the steering shaft 63a, is also shown in the same figure. The internal combustion engine E is mounted on the vehicle body so that a cylinder portion E0 thereof is somewhat inclined backward (see FIG. 1). In the same figure, at the left side of the figure, a front portion E1 of the engine E faces the front side of the body of the snowmobile 60. The front portion E1 of the engine E constitutes an exhaust side, and therefore the exhaust pipes E11 extend from the front portion E1.

Figure 4:
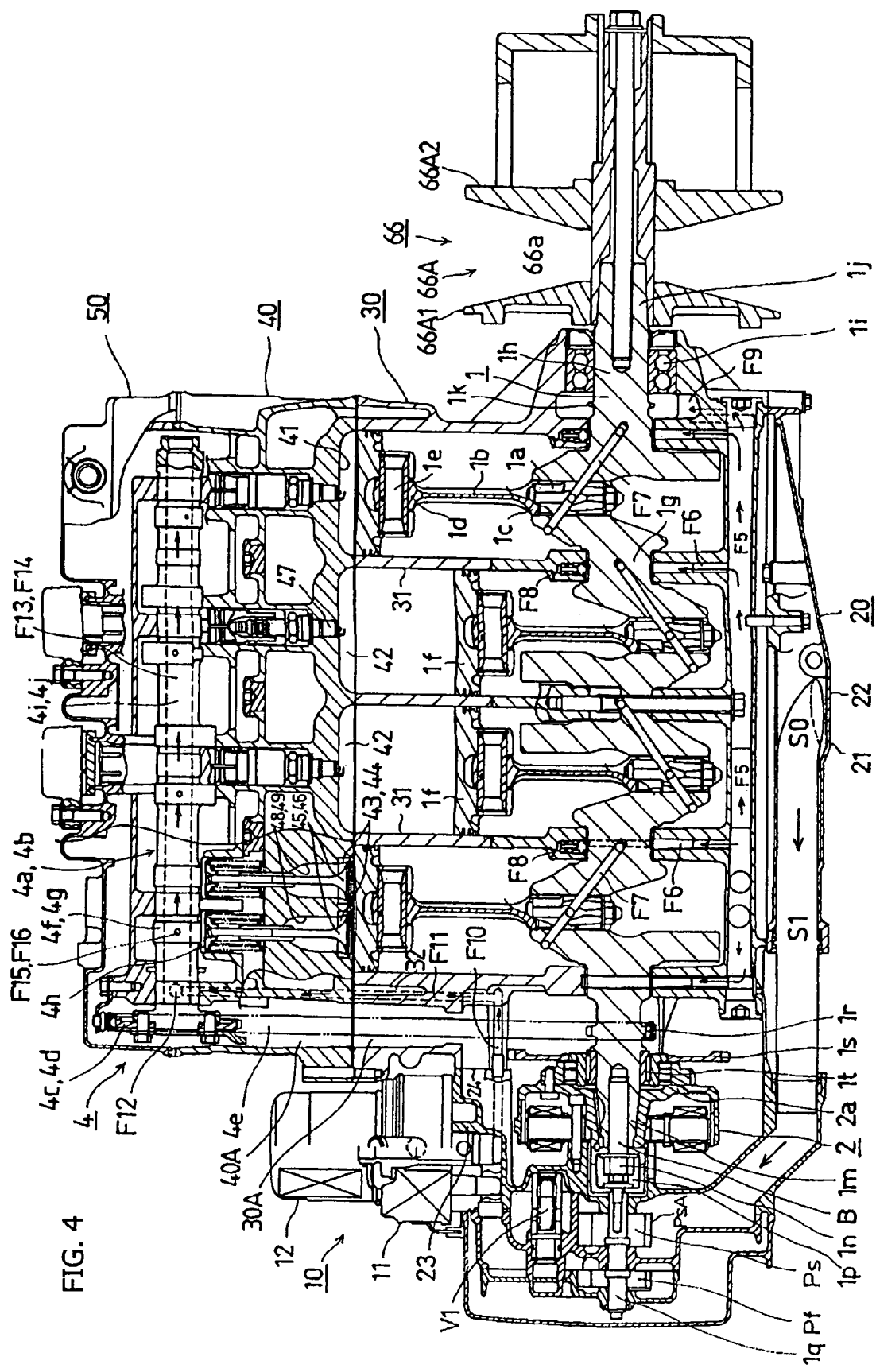
FIG. 4 is a longitudinal sectional view of the internal combustion engine of FIG. 3, taken along a vertical plane and showing the location of the oil pumps and oil cooling and filtering unit, as well as a portion of the oil flow passages.

The internal combustion engine E, whose principal portion is shown in a longitudinal section view of FIG. 4, has a body structure including a crank case 20, a cylinder block 30, a cylinder head 40, and a cylinder head cover 50. Within the crank case 20, a crankshaft 1 is rotatably supported through bearings. The large end portions 1c of connecting rods 1b are respectively pivotally supported by four crank pins 1a of the crankshaft 1, and pistons If are respectively secured to small end portions 1d of the connecting rods 1b through pistons 1e. As is seen from this description, the internal combustion engine E in this embodiment is an in-line four-cylinder four-cycle engine.

The crankshaft 1 is supported by five journal portions 1g of the crank case 20 and is further supported at a position close to a right end 1h by a ball bearing 1i, taking into account the presence of the V belt type automatic transmission 66. The driving pulley 66A of the V belt type automatic transmission 66 is mounted on a right extending shaft portion 1j of the crankshaft 1 extending outside the shaft bearing portion constituted by the ball bearing 1i.

More specifically, the V belt type automatic transmission 66 transmits the shifted rotational drive force to the driving wheel 67, for propulsion to enable travel of the vehicle. The V belt type transmission is constructed such that, as shown in FIGS. 1 and 3, a rotational drive force of the driving pulley 66A is transmitted, at a desired reduction gear (transmission gear) ratio, to the driven pulley 66B side through a V belt 66C. It is then transmitted from the driven pulley 66B to a sprocket (not shown) coaxial with the driving wheel 67 through a sprocket (not shown) coaxial with the pulley 66B. The transmission of the drive force between both sprockets is performed through a chain (not shown) or the like which is stretched between the two.

The rotational drive force is thus transmitted to the sprocket coaxial with the driving pulley 67. The rotational drive force causes the driving wheel 67 to rotate, whereby the endless track belt 65 is rotated along a slide rail 65a while being guided by the slide rail.

The V belt type automatic transmission 66 will now be described with reference to FIG. 5. When the engine E is rotating at a low speed or is OFF, the driving pulley 66A is held under the action of a spring (not shown) disposed on the driven pulley 66B side. The action of the spring is such that a V groove 66a thereof becomes wider, that is, a substantial effective diameter of the pulley 66A becomes smaller, and a V groove 66b of the driven pulley 66B becomes narrower, that is, a substantial effective diameter of the pulley 66B becomes larger.

Figure 5:
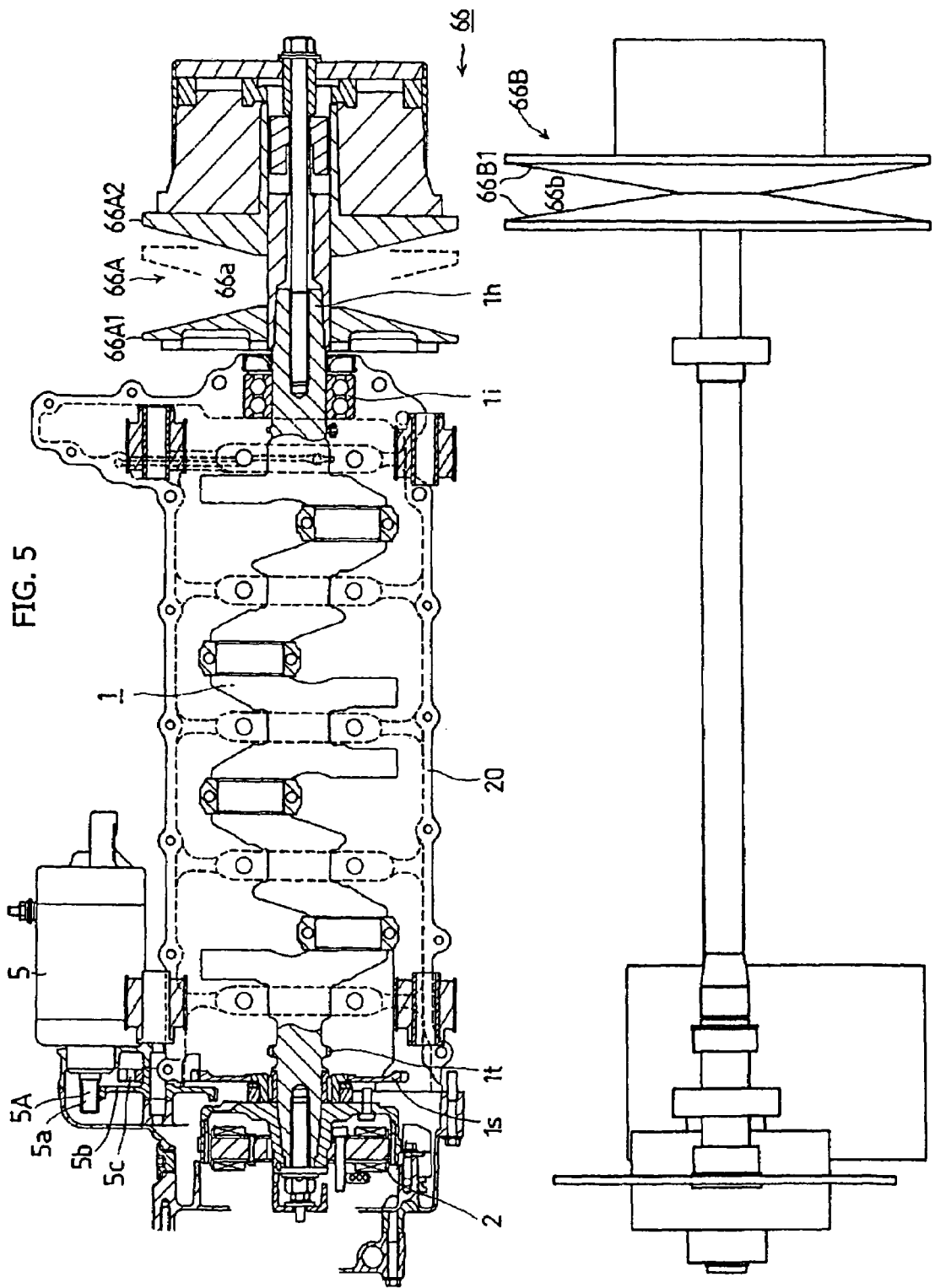
FIG. 5 is a partial sectional view of an automatic transmission in a drive mechanism for the snowmobile of FIG. 1 showing the V belt type pulleys on one end, and the starter motor on the opposed end.

A movable pulley piece 66A2 of the driving pulley 66A is provided with a weight member not shown in FIG. 5. The weight member functions to change the reduction gear (transmission gear) ratio in the V belt type automatic transmission 66. The weight member moves radially of the pulley piece 66A2 under the action of a centrifugal force proportional to the rotation of the engine E (crankshaft 1), so that the pulley piece 66A2 moves in a direction in which the width of the V groove 66a is changed. In this way, the reduction gear ratio is changed and a shift is made automatically in a continuously variable manner.

According to this structure, when the engine E, and specifically when the crankshaft 1, rotates at a high speed, the weight member (not shown) moves radially outwards of the movable pulley piece 66A2 against the spring force (the spring of the driven pulley 66B). The movable pulley piece 66A2 is moved in a direction in which the width of the V groove 66a of the driving pulley 66A is narrowed. Consequently, the position of contact of the V belt 66C with the V groove 66a on which it is entrained is shifted radially outwards, and thus a substantial effective diameter of the driving pulley 66A is made large.

On the other hand, in the driven pulley 66B, as the position of contact of the V belt 66C on the driving pulley 66A side shifts radially outwards, a pulley piece 66B 1 is moved against the spring force (not shown) conversely in a direction in which the width of the V groove 66b becomes larger, whereby a substantially effective diameter of the driven pulley 66B is made small and so is the reduction gear ratio. The endless track belt 65 is driven at this reduction gear ratio and the snowmobile 60 runs at a high speed.

When the engine E, specifically crankshaft 1, rotates at a low speed, the weight member is positioned radially inside of the movable pulley piece 66A2. The movable pulley piece 66A2 is moved in a direction in which the V groove 66a is widened, so that a substantially effective diameter of the driving pulley 66A is made small. On the other hand, in the driven pulley, the V groove 66b is conversely narrowed, a substantial effective diameter of the driven pulley 66B is made large and so is the reduction gear ratio. The endless track belt 65 is driven at this reduction gear ratio and the snowmobile 60 runs at a low speed. Such a V belt type automatic transmission 66 itself is already known.

Referring again to FIG. 4, as can be seen from the same figure, a sprocket $1k$ of a small diameter is disposed at a position adjacent to the support portion of ball bearing $1i$ close to the right end $1h$ of the crankshaft 1. A chain Pwc is stretched between the sprocket $1k$ and a sprocket Pwb. The sprocket Pwb is mounted on a pump shaft Pwa of a water pump Pw which will be described later (see FIGS. 3 and 12). The water pump Pw is activated with the chain Pwc, in interlock with rotation of the crankshaft 1.

On the other hand, a rotor $2a$ of a generator 2 is mounted near a left end $1m$ of the crankshaft 1. A bolt B is implanted into the left end $1m$ of the shaft 1 to form an extending shaft portion $1n$. An oil pump shaft $1q$ is coaxial with the extending shaft portion $1n$. The oil pump shaft $1q$ is connected to the extending shaft portion In and is thereby connected with the end portion $1m$ through a joint $1p$. Two oil pumps, the oil feed pump Pf and the oil scavenger pump Ps, are mounted side by side on the oil pump shaft $1q$.

One oil pump Pf is a feed pump for the supply of lubricating oil, while the other oil pump Ps is a scavenging pump for return of oil staying in a bottom 21 of the crank case 20 to a dry sump oil tank. A description will be given later of the supply and delivery of lubricating oil by both pumps Pf and Ps, and therefore an explanation thereof will be deferred.

A timing sprocket $1r$ of a small diameter is mounted on the crankshaft 1 at a position close to the left end $1m$ of the crankshaft. The timing sprocket $1r$ is for actuating two cam shafts $4a$ and $4b$ in a valve operating system 4. A cam chain $4e$ is stretched between sprockets $4c$, $4d$ mounted on the cam shafts $4a$, $4b$, and the timing sprocket $1r$. The rotation of the crankshaft 1 is transmitted to the two cam shafts $4a$ and $4b$ by the timing sprocket $1r$ at ½ the number of revolutions.

A flywheel gear $1s$ is of a relatively large diameter and is mounted on the crankshaft 1 through a one-way clutch it at a position adjacent to the timing sprocket $1r$. The flywheel gear is, which is for a starter motor 5 (see FIG. 5), is interconnected to another gear $5a$ through the engagement of intermediate gears $5b$ and $5c$. The gear $5a$ is integral with a motor shaft 5A of the starter motor 5 (see FIG. 5).

The cylinder block 30 is connected to an upper portion of the crank case 20. Four side by side cylinder bores 31 are formed through the cylinder block 30. Pistons $1f$ are adapted to slide respectively through the interiors of the four cylinder bores 31. The cylinder head 40 is connected to an upper portion of the cylinder block 30.

In the cylinder head 40, four combustion chambers 42 are formed of four concave portions 41 and of the upper portions of the four cylinder bores 31. In each combustion chamber 42 there are provided intake and exhaust ports 43, 44, intake and exhaust valves 45, 46 for opening and closing the intake and exhaust ports 43, 44, and a spark plug 47.

Intake and exhaust passages 48, 49 are formed within the cylinder head 40. Intake and exhaust passages 48, 49 communicate with the intake and exhaust ports 43, 44 which are provided in the combustion chambers 42. In an upper portion of the cylinder head 40, there are provided a valve operating mechanism for actuating the intake and exhaust valves 45, 46. The valve operating mechanism includes, for example, cams $4f$, $4g$ and cam shafts (two) $4a$, $4b$, a drive mechanism for the valve operating mechanism, and tappets $4h$. Further, a cylinder head cover 50 is attached to the upper portion of the cylinder head 40.

Figure 6:
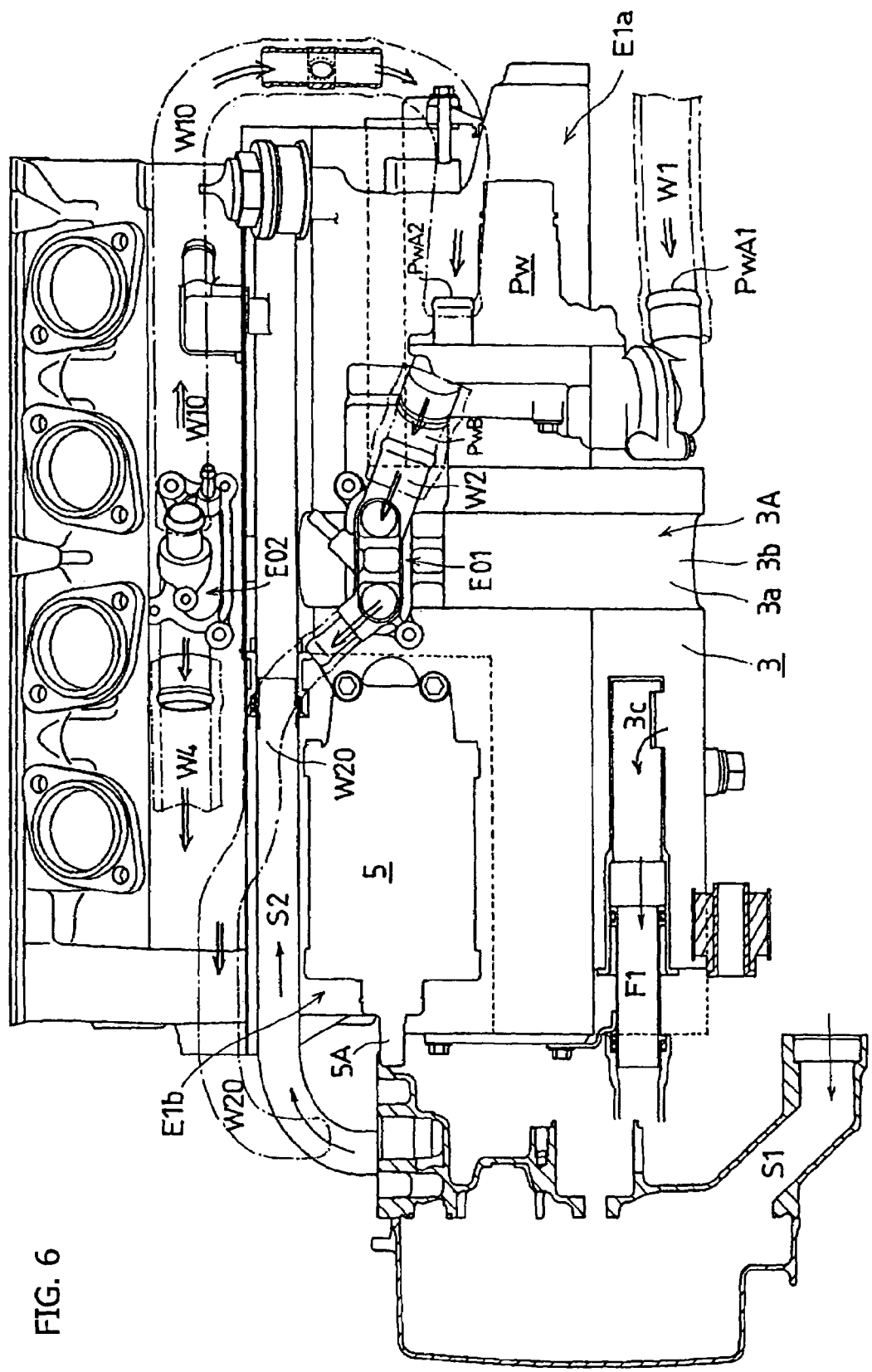
FIG. 6 is a front plan view of the internal combustion engine of FIG. 3, (ie, as viewed from the advancing direction), showing the oil tank in which a lower right portion of the tank is provided with a cutout in which the cooling pump resides, and in which a upper left portion of the tank is provided with a cutout in which the starter motor resides.
Figure 7:
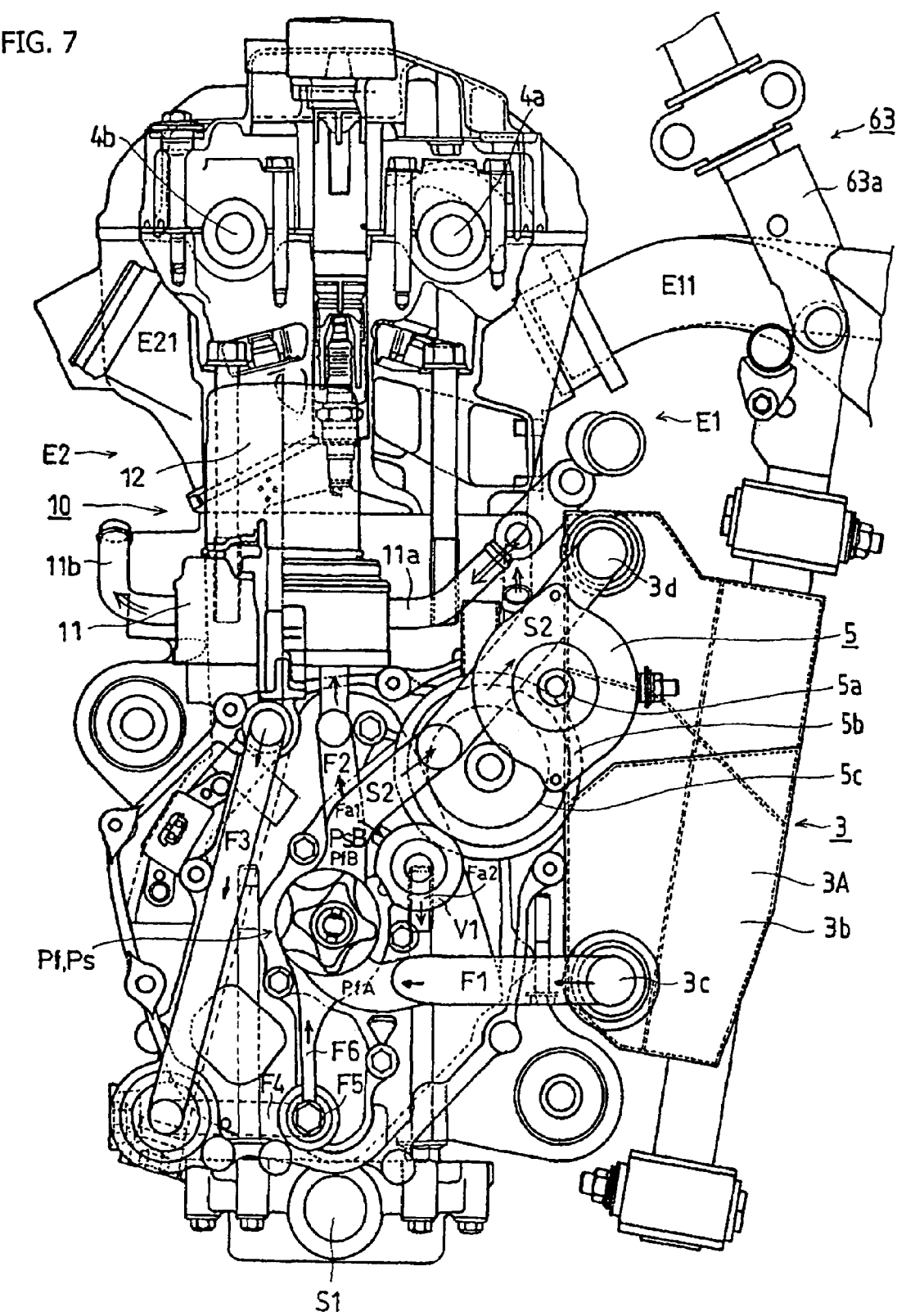
FIG. 7 is a side plan view of the engine of FIG. 3, showing oil tank mounted on a front side of the engine with the steering shaft extending therethrough, and showing a portion of the lubrication pathways through the engine.
Figure 8:
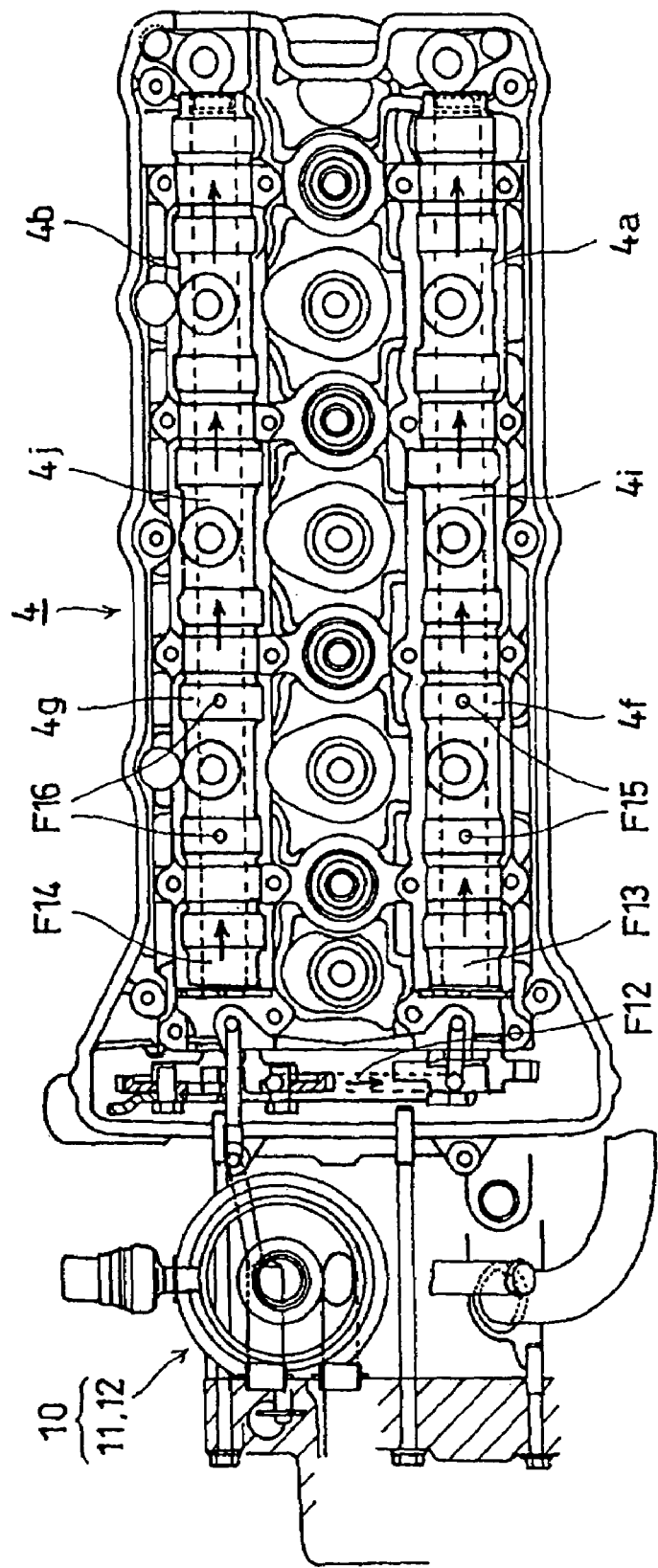
FIG. 8 is a top plan view of a portion of the internal combustion engine of FIG. 3 showing lubricating oil supply paths formed therein in the vicinity of the cam shafts.

As shown in FIGS. 3 and 7, the dry sump oil tank is disposed in the front portion E1 of the internal combustion engine E at a position corresponding to wall portions of the crank case 20 and the cylinder block 30 in the engine E. In other words, the dry sump oil tank is disposed in the front portion E1 of the wall portions of the engine E, substantially orthogonal to the vehicle advancing direction. The dry sump oil tank has a length corresponding to approximately the entire width of the front portion E1. As shown in FIG. 6, in a front view of the tank 3 as seen from the front portion E1 of the engine E, a lower right portion of the tank 3 has a first recess formed therein, which is cut out in a rectangular shape to form a space E1$a$ in the engine front portion E1. In addition, a upper left portion of the tank has a second recess formed therein, which is cut out in a rectangular shape to form a space E1$b$ in the engine front portion E1.

The cooling pump Pw is positioned in the space E1$a$ formed by the lower right cutout portion of the dry sump oil tank. The pump Pw is received within the space E1$a$ and thereby is mounted in the front portion E1 of the engine E in such a manner that a cooling water intake suction port PwA1 thereof is located at a lower position and a discharge port PwB thereof is located at an upper position.

The starter motor 5 is positioned within the space E1$b$ formed by the upper left cutout portion. The starter motor 5 is received within the space E1$b$ and thereby is mounted in the engine front portion E1 in such a manner that the motor shaft 5A of the starter motor 5 projects leftwards in the figure, i.e., in a transversely outward direction of the engine E.

A concave groove $3b$ is formed in a nearly transversely central portion $3a$ of the tank 3, as seen in the front view of the dry sump oil tank shown in FIG. 6. The concave groove $3b$ has a generally arcuate section. The concave groove $3b$ is used to receive the steering shaft $63a$ therein (see FIG. 7) so that the steering shaft $63a$ passes vertically through the tank 3 and is connected to the steering handlebar $63b$ of the snowmobile 60. The concave groove $3b$ has a steering post 3A which faces somewhat obliquely in the vertical direction to match the extending direction of the steering shaft $63a$.

As can be seen from the above description and from FIG. 6, in the front portion E1 of the engine E, the water pump Pw and the starter motor 5 are disposed in a well-balanced state at respective right and left positions. As such, the water pump Pw and the starter motor 5 sandwich the concave groove $3b$ therebetween, which extends vertically through the tank 3 at the tank central portion $3a$ for the steering post 3A. It should be emphasized that a characteristic structure of the invention is that the dry sump oil tank, the water pump Pw, and starter motor 5 are disposed so as to be concentrated within a small space in the front portion E1 of the engine E. With this arrangement, the rider who rides next to a rear portion E2 of the engine E can closely approach and easily access the engine.

Figure 11:
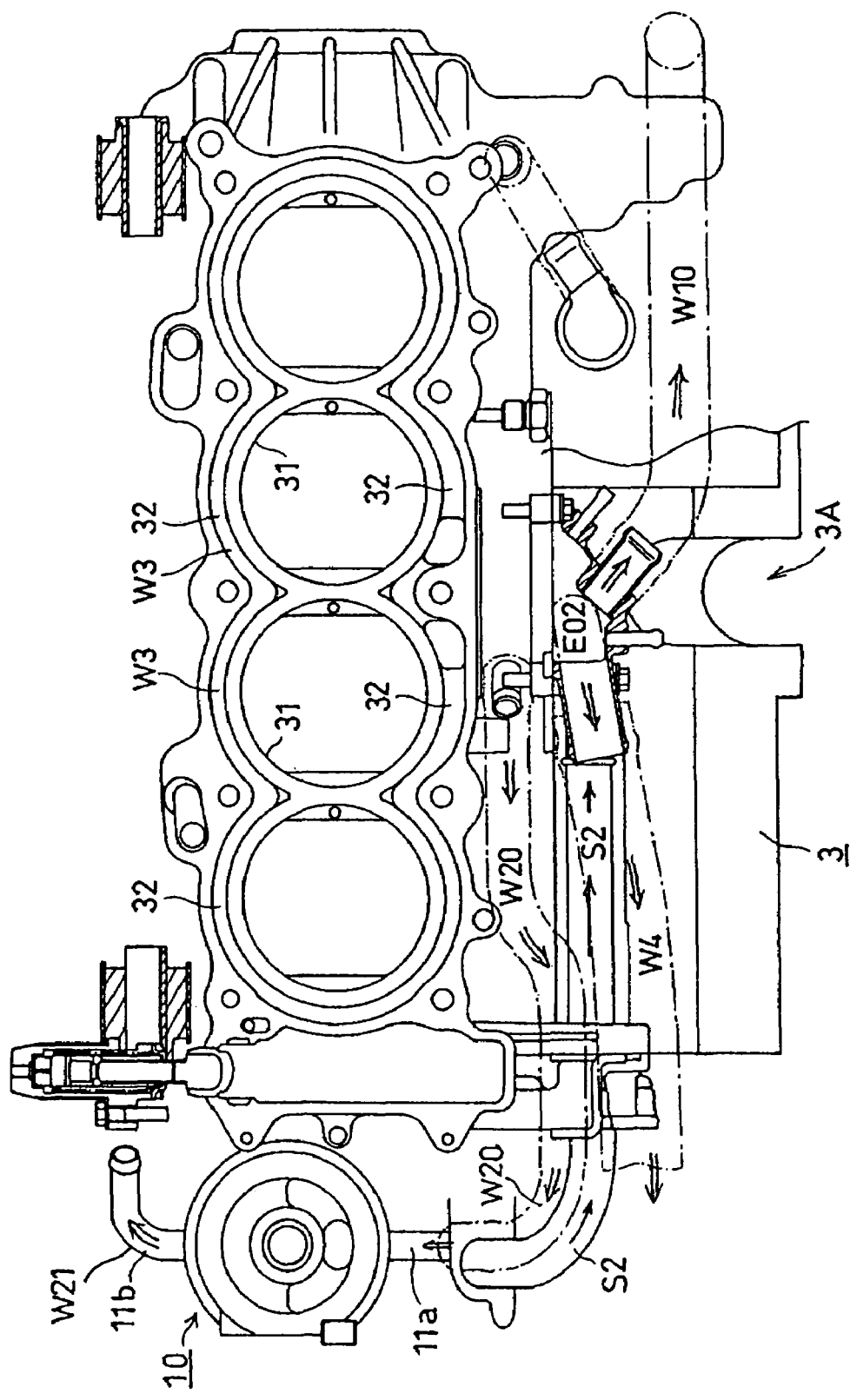
FIG. 11 is a diagram of cooling water supply paths in the internal combustion engine of FIG. 1.

An oil cooler 11 and an oil filter 12 are disposed in a side portion of the engine E (the left side face in FIG. 4), parallel to the vehicle advancing direction of the engine E, as shown in FIGS. 4, 7 and 11. The oil cooler 11 and an oil filter 12 are disposed in the portion corresponding to the wall portions of cylinder block 30 and the cylinder head 40, and at positions approximately above the oil pumps Pf, Ps and the generator 2 on the left end $1m$ of the crankshaft 1. The oil cooler 11 and the oil filter 12 are integral with each other as an oil processing unit 10. In its mounted state, a lower structural portion of the oil processing unit 10 is attached to an upper portion of a crank case cover 23, whereby the above layout is effected.

The oil cooler 11 is integrally formed as the lower structural portion in the mounted state of the oil processing unit 10. For example, the oil cooler 11 comprises the lower structural portion of oil processing unit 10 mounted to the upper portion of the crank case cover 23. The oil cooler 11 has a cylindrical heat exchanger portion (not clearly shown), and a cooling water inlet pipe 11a and discharge pipe 11b for the heat exchanger are provided (see FIG. 11). Oil filter 12 comprises an upper structural portion of the oil processing unit 10.

A description will now be given of the lubricating oil supply structure in connection with the internal combustion engine E according to this embodiment. The lubricating oil supply structure adopts a so-called dry sump method. The structure of the lubricating oil supply path is shown fragmentarily in plural drawings and is difficult to understand. In the following description, therefore, reference is made to FIG. 10 which is a schematic diagram showing a lubricating oil supply system used in this embodiment.

Figure 9:
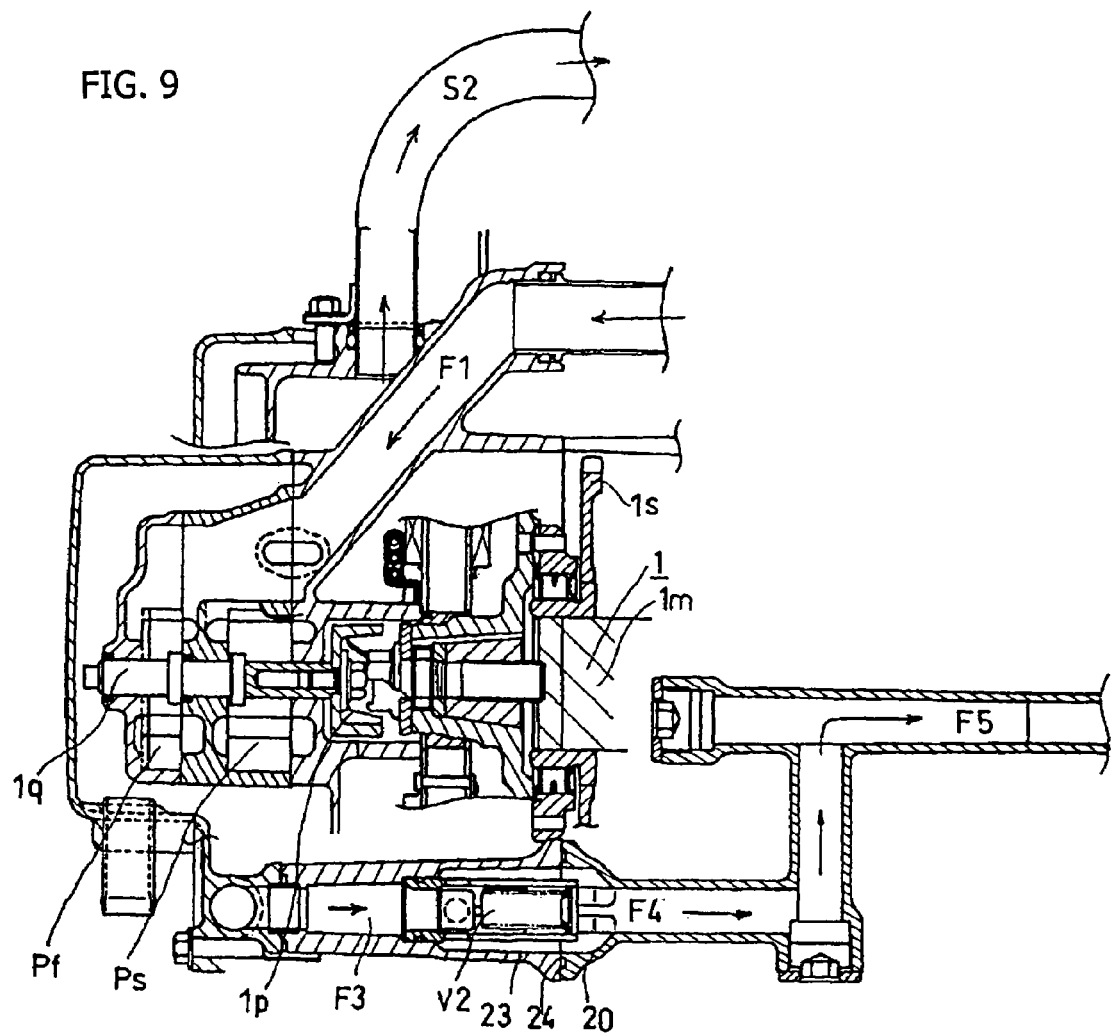
FIG. 9 is an enlarged sectional view of a lower end portion of the engine of FIG. 3, showing lubricating oil supply paths associated with the oil feed pump and oil scavenging pump.
Figure 10:
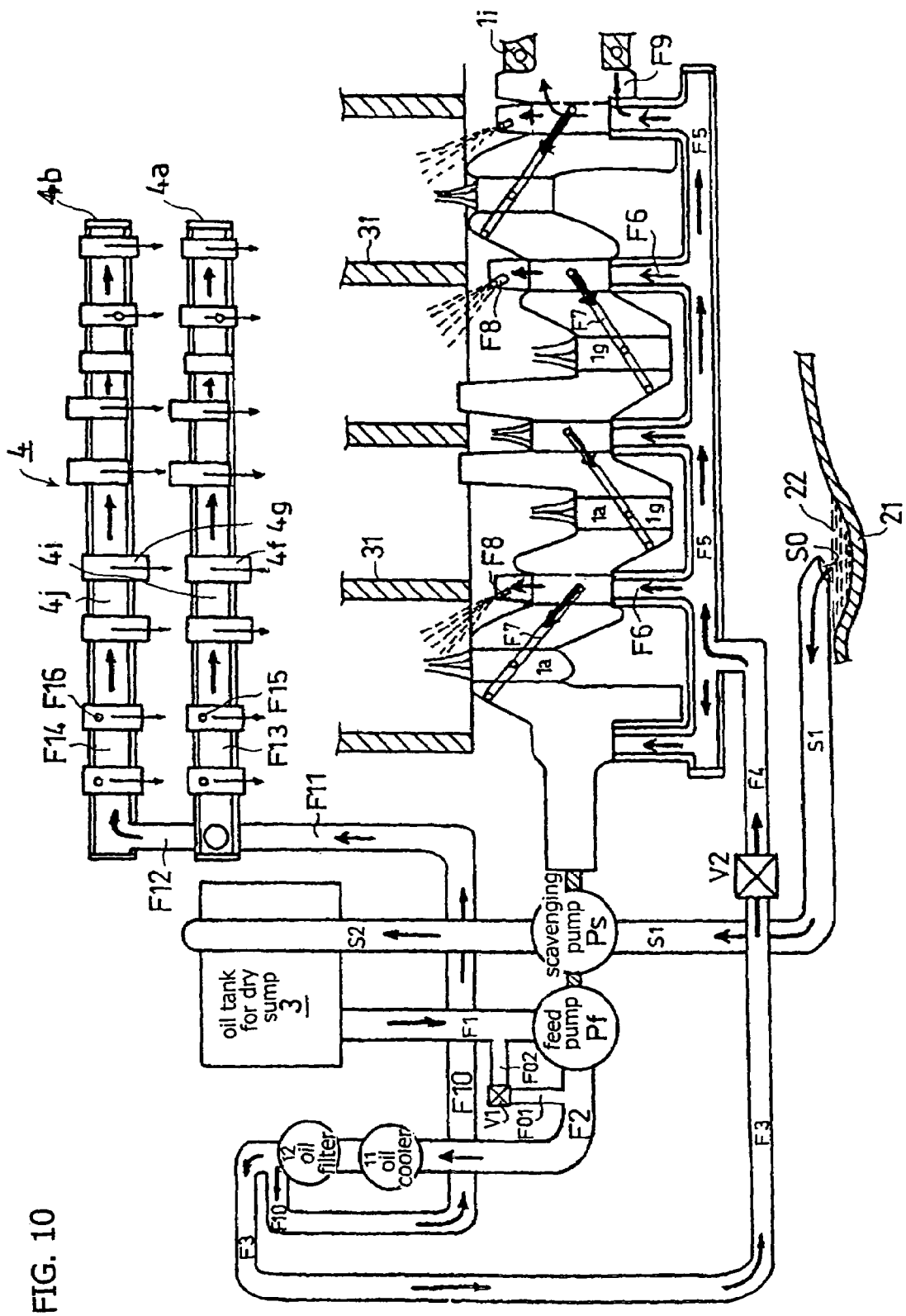
FIG. 10 is a schematic diagram of the lubricating oil supply system in the internal combustion engine of FIG. 3, showing oil being transferred by the feed pump from the dry sump oil tank to the oil gallery and valve operating system, and accumulated oil transferred by the scavenger pump from the oil sump in the bottom of the crankcase back to the dry sump oil tank.

As already described and as shown in FIGS. 4 and 9, at the left end 1m of the crankshaft 1, the feed pump Pf and the scavenging pump Ps are mounted side by side on the pump shaft 1q. The shaft 1q is adapted to rotate coaxially and interlockingly with the crankshaft 1.

As shown in FIG. 7, a suction port PfA of the feed pump Pf is in communication through a lubricating oil suction path F1 with an opening 3c formed in a lower portion of the dry sump oil tank. Further, a discharge port PfB of the feed pump Pf is in communication through a lubricating oil supply path F2 with the oil processing unit 10 which is an integral structure of the oil cooler 11 and the oil filter 12. The lubricating oil supply path F2 provides a communication between the oil cooler 11 as the lower structural portion of the oil processing unit 10 and the discharge port PfB of the feed pump Pf. When the feed pump Pf is activated, lubricating oil present within the dry sump oil tank is fed to the oil processing unit 10.

A branch oil path F01 (see FIG. 10) is provided in the lubricating oil supply path F2 and a relief valve V1 (see FIGS. 1 and 7) is disposed in the branch oil path F01. The relief valve V1 functions to regulate the lubricating oil supply pressure in the lubricating oil supply path F2. Oil flowing out from the relief valve V1 passes through a branch oil path F02 (see FIG. 10) and is again returned to the lubricating oil suction oil path F1.

As can be seen by reference to FIGS. 4, 7, 8 and 9, the lubricating oil is fed to the oil processing unit 10, cooled by the oil cooler 11 within the oil processing unit 10, and filtered by the oil filter 12. The lubricating oil is then fed from a lubricating oil outlet of the oil processing unit 10 to the oil gallery F5 and valve operating system 4 through branch supply paths. The branch supply paths include lubricating oil supply paths F3 and F4 (see FIG. 7) for the supply of lubricating oil to the oil gallery F5, and lubricating oil supply paths F10 and F11 (see FIG. 4) for the supply of lubricating oil to the valve operating system 4.

A check valve V2 is disposed in the lubricating oil supply paths F3 and F4, which are branch supply paths to the oil gallery F5 communicating with the lubricating oil outlet of the oil processing unit 10 (see FIG. 9). The check valve V2 is disposed by utilizing a connection 24 between the crank case 20 and the case cover 23.

As shown in FIG. 4, the oil gallery F5 extends below and in parallel with the crankshaft 1 so that the length of the extension corresponds to approximately the overall length of the crankshaft 1. Plural lubricating oil supply paths F6 and F7 communicate with the journal portions 1g of the crankshaft 1 and with the crank pin portions 1a to which the connecting rods are connected, injection ports F8 for inner walls of the cylinder bores 31, and a lubricating oil supply path F9 communicating with the ball bearing 1i positioned close to the right end of the crankshaft 1. The plural lubricating oil paths F6 and F7 are also in communication with the oil gallery F5.

Lubricating oil supply paths F10 and F11 communicate with the cam shafts 4a and 4b in the valve operating system 4 and are formed as in FIG. 4. As shown in the same figure, the lubricating oil supply path F10 communicates with the lubricating oil outlet of the oil processing unit 10 and extends horizontally past the connection 24 between the crank case 20 and the crank case cover 23. The lubricating oil supply path F11 is bent at approximately right angles from the supply path F10, and extends upward along openings 30A and 40A. Openings 30A and 40A are formed respectively in the cylinder block 30 and the cylinder head 40 at the upper portion of the crank case 20 to allow for the cam chain 4e. The lubricating oil supply paths F10 and F11 communicate through a branch supply path F12 with lubricating oil supply paths F13 and F14 formed within the cam shafts 4a and 4b. Plural apertures F15 and F16, which are open to cam surfaces, are formed respectively in the lubricating oil supply paths F13 and F14 (see FIG. 8).

A suction port PsA (see FIG. 4) of the scavenging pump Ps, juxtaposed to the feed pump Pf, is connected to an oil path S1 which is for the suction of the oil (to be described later) accumulated in the bottom 21 of the crank case 20. In FIG. 4, the bottom oil suction oil path S1 extends from the pump suction port PsA to an oil sump portion 22. The oil sump portion 22 is positioned nearly centrally of the bottom 21 of the crank case 20. An opening S0 for the suction of oil remaining in the oil sump portion 22 is formed in an extending end of the suction oil path S1. The extending end of opening S0 faces the oil sump portion 22.

The bottom oil suction oil path S1 extends from the oil sump portion 22 substantially horizontally along the bottom 21 of the crank case 20, and below and in parallel with the crankshaft 1 and the oil gallery F5. The bottom oil suction path S1 then is brought into communication with the suction port PsA of the scavenging pump Ps.

As shown in FIG. 7, a discharge port PsB of the scavenging pump Ps communicates through with an upper opening 3d of the dry sump oil tank through a bottom oil return oil path S2, the oil path S2 extending substantially obliquely upwards toward an upper portion of the oil tank 3 from the pump discharge port PsB. Thus, with the bottom oil recovering oil paths S1 and S2 communicating with the scavenging pump Ps, the oil staying in the crank case bottom 21 is returned to the dry sump oil tank upon operation of the scavenging pump Ps.

A description will now be given of the supply of lubricating oil in the internal combustion engine E with reference to FIGS. 4, 7, 8 and 9. In the following description, as in the above description, reference is made to FIG. 10 which is a schematic diagram of the lubricating oil supply system.

Upon start-up of the internal combustion engine E and with rotation of the crankshaft 1, the feed pump Pf and the scavenging pump Ps are each activated. When the feed pump Pf is activated, as shown in FIG. 7, the lubricating oil present within the dry sump oil tank is sucked into the pump Pf from the pump suction port PfA through the lubricating oil suction oil path F1. The pump pressure of the lubricating oil is increased within the pump Pf and then the pressurized lubricating oil is discharged from the discharge port PfB of the pump Pf.

The pressurized lubricating oil is then fed from the lubricating oil feed path F2 to the oil processing unit 10, which is an integral structure comprising both the oil cooler 11 and the oil filter 12. The feed pressure in the lubricating oil feed path F2 is regulated by the relief valve V1 disposed in the branch oil path F01 (see FIG. 10) and the lubricating oil flowing out under the pressure regulating action of the valve V1 passes through the branch oil path F02 (see FIG. 10) and is again returned to the lubricating oil suction oil path F1.

The lubricating oil which has entered the oil processing unit 10 circulates through the oil processing unit 10 while being cooled by the heat exchanger portion of the oil cooler 11 and filtered by the oil filter 12. The lubricating oil thus cooled and filtered within the oil processing unit 10 is then fed to the oil gallery F5 and the cam shafts 4a, 4b in the valve operating system 4 through the branch lubricating oil supply paths F3, F4 and F10, F11 (see FIG. 4).

The lubricating oil, which has been fed under pressure to the branch lubricating oil supply path F3 communicating with the oil gallery F5, pushes open the check valve V2 (see FIG. 9), then flows through the lubricating oil supply path F4 and is fed to the oil gallery F5. The lubricating oil thus fed to the oil gallery F5 flows through the oil gallery F5 which extends below and along the crankshaft 1.

The lubricating oil thus flowing through the oil gallery F5 then passes through the branch lubricating oil supply paths F6 and F7, and is fed to the journal portions 1g of the crankshaft 1 and the crank pin portions 1a to which the connecting rods 1b are connected. The lubricating oil is also fed to the inner wall portions of the cylinder bores 31 from the lubricating oil injection port F8, and is further fed through the branch lubricating oil supply path F9 to the ball bearing 1i positioned close to the right end of the crankshaft 1 (see FIG. 4).

On the other hand, the lubricating oil, which has been fed under pressure to the branch lubricating oil supply paths F10 and F11 communicating with the cam shafts 4a and 4b in the valve operating system 4, first flows through the lubricating oil supply path F10 which extends horizontally through the connection 24 between the crank case 20 and the case cover 23, then turns at approximately right angles and flows into the lubricating oil supply path F11. The oil supply path F11 extends upward inside and along the wall portions of the openings 30A, 40A in the cylinder block 30 and the cylinder head 40 and also along a water jacket 32 of the cylinder block 30 (see FIG. 4).

The lubricating oil which has flowed through the lubricating oil supply path F11 is divided by, and within, the lubricating oil supply path F12 which branches in two at an upper portion of the supply path F11. The lubricating oil then flows through the lubricating oil supply paths F13 and F14, formed as hollow bores 4i and 4j within the two cam shafts 4a and 4b, i.e., the intake-side cam shaft 4a and the exhaust-side cam shaft 4b. The lubricating oil then flows out from plural cam surfaces through the apertures F15 and F16 which are open to the cam surfaces, and is used for lubricating and cooling the cam surfaces of the cams 4f, 4g and the tappets 4h (see FIGS. 4 and 8). The return oil which has been used for lubrication, though not clearly shown, is allowed to flow to the oil sump portion 22 of the bottom 21 of the crank case 20 through a return oil path or the like which extends through the cylinder block 30.

Though not clearly shown and explanations are omitted, lubricating oil is fed to drive shafts of accessory devices through other branch lubricating oil supply paths. The lubricating oil which has been used for lubricating various portions of the engine E then flows down dropwise through the interior of the engine E and is allowed to flow to the oil sump portion 22 of the bottom 21 of the crank case 20 through a lubricating oil return oil path though not clearly shown (see FIG. 4).

The lubricating oil, which has been used for lubricating the above various portions of the internal combustion engine E, and then has flowed down and or dripped into the oil sump portion 22 of the bottom 21 of the crank case 20 or has flowed into the oil sump portion 22 through a return oil path (not shown), is sucked in from the pump suction port PsA through the bottom oil suction oil path S1 by means of the scavenging pump Ps which is driven along with the feed pump Pf. The bottom oil, whose pressure has been raised within the pump Ps, is returned and recovered from the upper opening 3d of the dry sump oil tank into the tank 3 through the bottom oil return oil path S2 (see FIGS. 4 and 7), then is again fed to the various portions of the engine E through the foregoing lubricating oil supply paths.

A description will now be provided for the cooling structure in the internal combustion engine E.

As shown in FIG. 6 and as described earlier, the water pump Pw is disposed in the cutout space E1a of the dry sump oil tank in the front portion E1 of the internal combustion engine E. The water pump Pw is adapted to be rotated in synchronism with rotation of the crankshaft 1 through the chain Pwc. The chain Pwc is stretched between the sprocket 1k, (see FIGS. 3 and 4) positioned close to the right end 1h, and the sprocket Pwb, mounted on the water pump shaft Pwa (see FIGS. 3 and 12).

Figure 12:
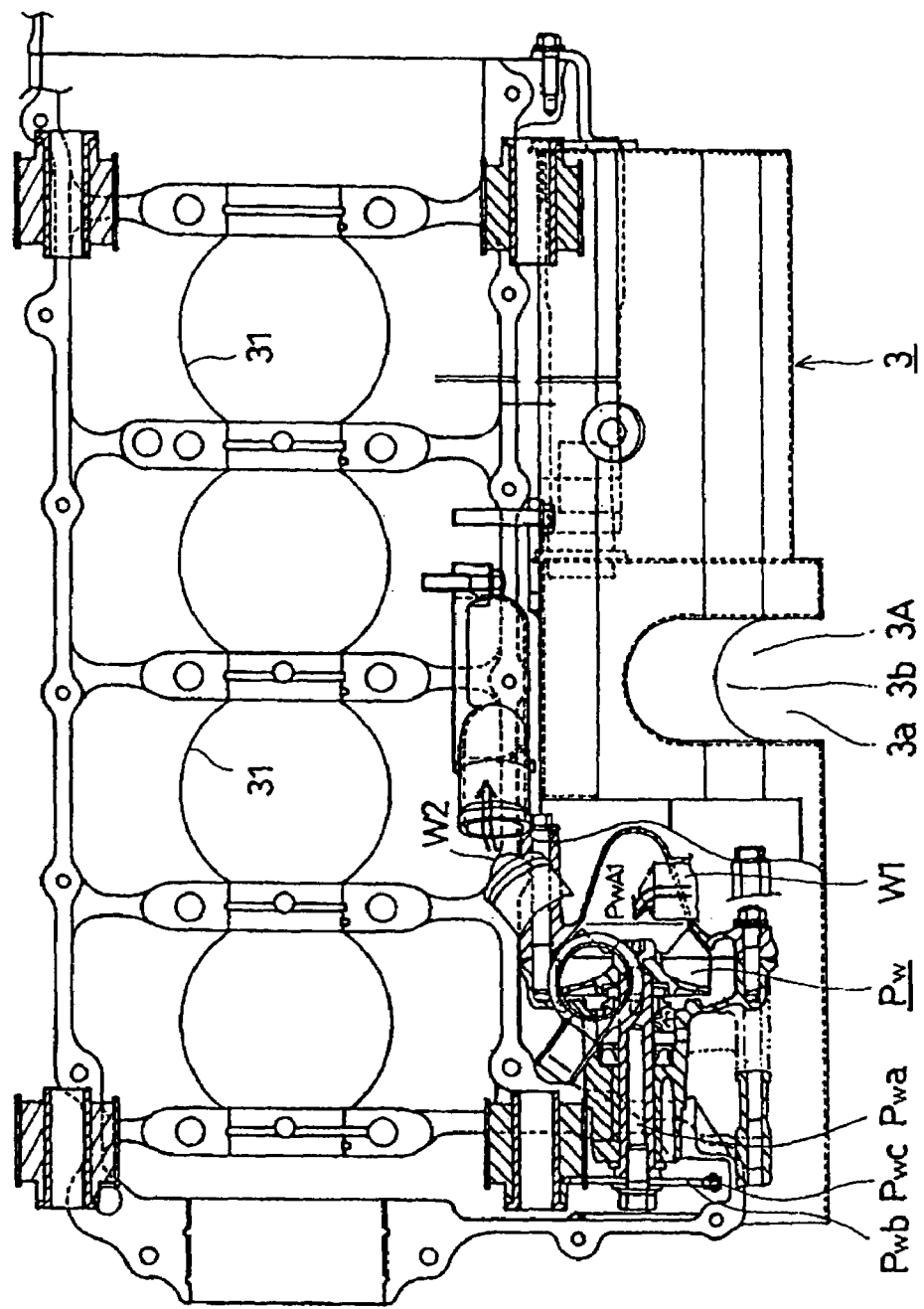
FIG. 12 is a partial sectional view of the main cooling water supply structure in the internal combustion engine of FIG. 3 showing the concave portion in the oil tank shaped to accommodate the steering shaft.
Figure 13:
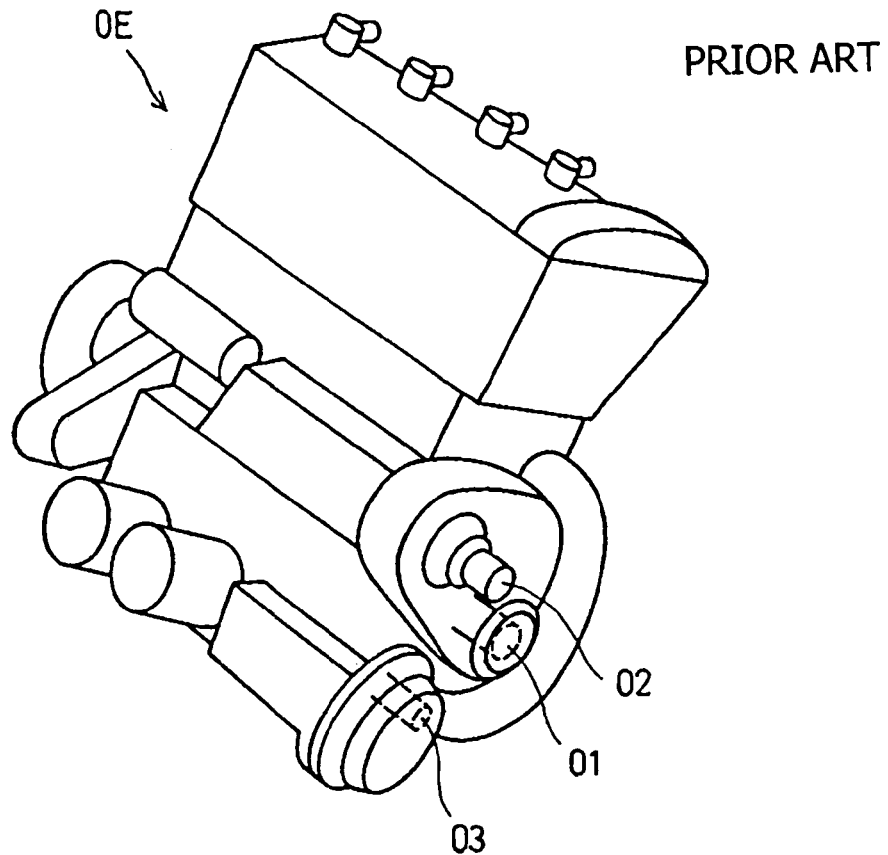
FIG. 13 is a perspective view of a prior art internal combustion engine showing the conventional internal combustion isolated from a snowmobile and the triangular arrangement of the power output shaft, the crankshaft, and the pump drive shaft.
Figure 14:
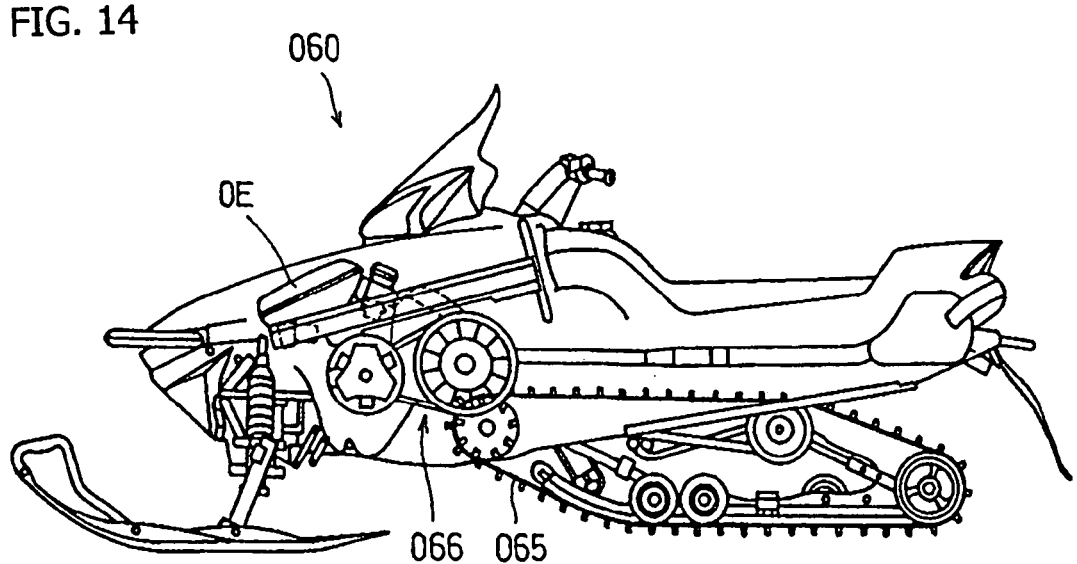
FIG. 14 is a side plan view of a prior art snowmobile on which the internal combustion engine shown in FIG. 13 is mounted.

As can be seen by reference to FIGS. 6 and 12, there is formed a cooling water return path W1 which provides communication between the cooling water suction port PwA1 of the water pump Pw and a cooling water outlet of the radiator 68 (see FIG. 1) disposed below the seat 64 of the snowmobile 60 not shown in FIGS. 6 and 12. Also provided is a cooling water supply path W2. The cooling water supply path W2 provides communication between the cooling water discharge port PwB of the water pump Pw and the cooling water inlet port E01 for the interior of the central part of the front portion E1 of the internal combustion engine E. Further provided is a cooling water supply path W3. The cooling water supply path W3 includes the water jacket 32 for conducting the cooling water introduced from the cooling water inlet port E01 to around the cylinder bores 31 in the engine E. (see FIG. 11).

Additionally, there is provided a cooling water path W4, with a thermostat and a reservoir tank (neither shown) interposed therein, for communication between an outlet of the cooling water supply path W3, i.e., a cooling water discharge port E02 from the engine E, and a cooling water inlet of the radiator 68. Also provided is a cooling water bypath W10. The cooling water by path W10 branches from the thermostat to bypass the cooling water when the cooling water temperature is low, such as during warming up (see FIGS. 6 and 11). The cooling water bypath W10 is in communication with a suction port PwA2 (see FIG. 6) of the water pump Pw.

The cooling water inlet port E01 for the interior of the engine E is positioned nearly centrally in the vertical direction of the cylinder block 30. The cooling water discharge port E02 for the discharge of cooling water from the interior of the engine E is located at an upper position in the vertical direction of the cylinder block 30. Thus, the cooling water inlet port E01 and the cooling water discharge port E02 are disposed in a generally vertically aligned (up and down) positional relation in the cylinder block 30 (see FIG. 6).

A cooling water supply path W20 is formed in the vicinity of the connection between the cooling water supply path W2 and the cooling water inlet port E01 (see FIGS. 6 and 11). The cooling water supply path W20 is connected to the cooling water inlet pipe 11a of the oil cooler 11. A cooling water path W21 (see FIG. 11) is connected to the cooling water discharge pipe 11b of the oil cooler 11. Though not shown, the cooling water path W21 is in communication with the cooling water path W4, which provides communication between the cooling water discharge port E02 and the cooling water inlet of the radiator 68.

Therefore, the water pump Pw rotates in interlock with rotation of the crankshaft 1 upon start-up of the internal combustion engine E to suck in cooling water from the suction port PwA1 after being cooled by the radiator 68. The pump pressure of the cooling water thus sucked into the pump Pw is increased within the same pump and is discharged from the discharge port PwB of the pump. The cooling water then passes through the cooling water supply path W2, further through the cooling water inlet port E01 for the interior of the central part of the front portion E1 of the internal combustion engine E (see FIG. 6), and flows into the cooling water supply path W3 including the water jacket 32, etc. in the engine E (see FIG. 11).

The cooling water thus flowing into the cooling water supply path W3 in the engine E is introduced into the water jacket 32 around the cylinder bores 31. The water jacket 32 constitutes a main portion of the cooling water path W3. The cooling water then passes through the jacket 32 and further through the cooling water supply paths formed within the cylinder head 40 (not shown) and absorbs heat. The thus-warmed cooling water is allowed to flow out to the exterior the engine E from the outlet of the cooling water path W3 in the engine, that is, from the cooling water discharge port E02 which is for the discharge of cooling water from the interior of the engine E. The water then flows through the cooling water path W4, which is a connection path to the radiator 68 communicating with the discharge port E02 (see FIG. 11), and is introduced from the upper portion of the radiator 68 into the radiator through the inlet of the radiator.

After being introduced into the radiator 68, the warmed cooling water circulates through the radiator while being deprived of heat and is cooled thereby. The cooling water thus cooled is again sucked into the suction port PwA1 of the water pump Pw through the cooling water return path W1 (see FIG. 6) and is circulated for cooling various portions of the engine E through the cooling water supply paths.

According to this embodiment constructed as above there are attained the following unique functions and effects.

Since accessory devices, such as the dry sump oil tank, the water pump Pw and the starter motor 5, as well as the steering shaft, are disposed closely clustered together in the front portion E1 of the engine E, that is, since the accessory devices and the steering shaft 63a are not disposed on the rider's side of the engine E, the rider can easily and closely approach the engine E.

The steering post 3A, including the concave groove 3b which receives the steering shaft 63a, is provided at approximately the central portion 3a of the dry sump oil tank. The dry sump oil tank is disposed in the front portion E1 of the internal combustion engine E. The right and left cutout spaces E1a, E1b are formed within the dry sump oil tank in a sandwiching relation to the steering post 3A. Further, the water pump Pw and the starter motor 5 are received within the cutout spaces E1a and E1b, respectively. Therefore, the engine E is well-balanced in its weight on the right and left sides. Additionally, the oil tank 3, the water pump Pw and the starter motor 5 are arranged compactly without waste in point of space. Thus, the amount of so-called dead space is decreased, and it is possible to not only compactly configure the surroundings of the engine E, but also ensure an effective space around the engine.

Since the surroundings of the internal combustion engine E can be made compact, there arises a space margin between the engine E and the snowmobile 60 which is useful in mounting the engine E onto the snowmobile 60. Specifically, as a result of obtaining a space margin, it becomes easier to install the engine E, the engine mounting work efficiency is improved, and costs are reduced.

The structure of the snowmobile described herein, including the internal combustion engine having the characteristic layout structure of accessory devices as described in the present invention, is also applicable to other vehicles within the scope including a common technical matter, e.g., a technical subject such that an advantage in point of space is to be ensured in engine installation.

While a working example of the present invention has been described above, the present invention is not limited to the working example described above, but various design alterations may be carried out without departing from the present invention as set forth in the claims.

What is claimed is:

1. A snowmobile, comprising:
   a body;
   an internal combustion engine mounted on a front side of the body, the internal combustion engine comprising a crankshaft;
   a seat provided on the body behind the internal combustion engine;
   an endless track belt operatively connected to the body;
   a transmission mechanism operatively connected between the crankshaft and the endless track belt, wherein rotation of the crankshaft is transmittable to the endless track belt through the transmission mechanism to drive the snowmobile; and
   a plurality of accessory devices;
   wherein selected accessory devices are disposed on the snowmobile in a concentrated area at a front portion of the internal combustion engine; and
   wherein one of said selected accessory devices comprises a dry sump oil tank which is mounted on a front face of the engine, such that the engine resides between the dry sump oil tank and the seat.

2. A snowmobile according to claim 1, wherein the selected accessory devices in a concentrated area at a front portion of the internal combustion engine further comprise a water pump and a starter motor.

3. A snowmobile according to claim 2, wherein the dry sump oil tank has a plurality of cutout spaces formed therein to receive some of said selected accessory devices, and wherein the water pump and the starter motor are respectively received within cutout spaces formed in the dry sump oil tank.

4. A snowmobile according to claim 1, wherein the dry sump oil tank is operatively attached to the front face of the engine and spaced away from the seat, the dry sump oil tank having an elongate groove formed therein, and
   wherein the snowmobile further comprises a steering shaft received in the elongate groove of the dry sump oil tank.

5. A snowmobile according to claim 1, wherein
   the dry sump oil tank has a first cut out portion formed therein at a lower portion of a first side edge thereof,
   the dry sump oil tank having a second cut out portion formed therein at an upper portion of a second side edge thereof, wherein the first and second sides of the dry sump oil tank are situated substantially opposite one another.

6. A snowmobile according to claim 5, wherein the accessory devices disposed in a concentrated area at the front portion of the internal combustion engine further comprise a water pump and a starter motor,
wherein the water pump is disposed in the first cut out portion of the dry sump oil tank, and wherein the starter motor is disposed in the second cut out portion.

7. A snowmobile according to claim 2,
wherein the dry sump oil tank is operatively connected to the front face of the engine,
wherein the dry sump oil tank has a plurality of cutout spaces formed therein to receive some of said selected accessory devices,
wherein the starter motor is mounted to the front face of the engine and is disposed within a first cutout portion of the dry sump oil tank, and
wherein the water pump is mounted to the front face of the engine and is disposed within a second cutout portion of the dry sump oil tank.

8. A snowmobile according to claim 7, wherein the snowmobile comprises a steering shaft,
wherein the dry sump oil tank has an elongate groove formed in a surface thereof at a medial portion of the dry sump oil tank, with respect to the transverse direction of the snowmobile,
wherein a portion of the steering shaft resides within the elongate groove, and
wherein the first cutout portion and the second cutout portion are disposed on opposed sides of the elongate groove.

9. In a snowmobile of the type having:
a body;
an internal combustion engine mounted on a front side of a body of the snowmobile,
a seat provided behind the internal combustion engine,
a steering shaft provided in front of the internal combustion engine, and
a plurality of accessory devices,
the improvement characterized in that selected accessory devices are compactly clustered in a front portion of the internal combustion engine on the snowmobile and wherein one of said selected accessory devices comprise a dry sump oil tank which is mounted on a front face of the engine, such that the engine resides between the dry sump oil tank and the seat.

10. A snowmobile according to claim 9, wherein the dry sump oil tank comprising an elongate groove formed therein, and
wherein the steering shaft resides within the elongate groove formed in the dry sump oil tank.

11. A snowmobile according to claim 9, wherein
the dry sump oil tank has a first cut out portion formed therein at a lower portion of a first side edge of the dry sump oil tank,
the dry sump oil tank has a second cut out portion formed therein at an upper portion of a second side edge of the dry sump oil tank,
wherein the first and second sides are opposed.

12. A snowmobile according to claim 11, wherein the accessory devices compactly disposed in the front portion of the internal combustion engine further comprise a water pump and a starter motor,
wherein the water pump is disposed in the first cut out portion, and wherein the starter motor is disposed in the second cut out portion.

13. A snowmobile according to claim 9, wherein the accessory devices compactly disposed in the front portion of the internal combustion engine further comprise a water pump and a starter motor, wherein:
the starter motor is mounted to the front face of the engine within a first cutout portion of the dry sump oil tank, and
the water pump is mounted to the front face of the engine within a second cutout portion of the dry sump oil tank.

14. A snowmobile according to claim 13, wherein
the dry sump oil tank comprises an elongate groove formed in a surface thereof at a central portion of the dry sump oil tank with respect to the transverse direction of the snowmobile,
the steering shaft resides within the elongate groove, and
the first cutout portion and the second cutout portion are on opposed sides of the elongate groove.

15. A snowmobile according to claim 9, wherein the accessory devices compactly disposed in the front portion of the internal combustion engine further comprise a water pump and a starter motor.

16. A snowmobile, comprising:
a body;
an internal combustion engine mounted on a front side of the body, the internal combustion engine comprising a crankshaft;
a seat provided on the body behind the internal combustion engine; and
a plurality of accessory devices;
wherein selected accessory devices are disposed on the snowmobile in a concentrated area at a front portion of the internal combustion engine; and
wherein one of said selected accessory devices has a plurality of cutout spaces formed therein to receive others of said selected accessory devices.

17. A snowmobile according to claim 16, wherein the selected accessory devices comprise a water pump, a dry sump oil tank, and a starter motor.

18. A snowmobile according to claim 17, wherein the dry sump oil tank comprises said one of said selected accessory devices having said cutout spaces formed therein.

19. A snowmobile according to claim 18, wherein the water pump and the starter motor are received in said cutout spaces of said dry sump oil tank.

* * * * *